United States Patent [19]
Le Van

[11] 3,964,345
[45] June 22, 1976

[54] MANUALLY OPERABLE BLENDER

[75] Inventor: Jacob J. Le Van, Seattle, Wash.

[73] Assignee: The Raymond Lee Organization, Inc., a part interest

[22] Filed: Mar. 10, 1975

[21] Appl. No.: 556,785

[52] U.S. Cl. .............................. 74/665 P; 74/417; 259/105
[51] Int. Cl.² .................... F16H 37/06; F16H 1/20; B01F 7/00
[58] Field of Search ....... 74/665 P, 665 M, 665 GA, 74/665 GB, 665 C, 665 E, 417; 259/105, 108

[56] References Cited
UNITED STATES PATENTS

| | | | |
|---|---|---|---|
| 1,251,836 | 1/1918 | Stufflebeam | 259/105 |
| 2,020,299 | 11/1935 | Cottingham | 259/105 |
| 2,272,125 | 2/1942 | Loone | 259/105 X |
| 2,798,700 | 7/1957 | Corbett et al. | 74/665 GA X |
| 2,917,929 | 12/1959 | Sprague | 74/665 GA X |

*Primary Examiner*—Leonard H. Gerin

[57] ABSTRACT

A hollow vertical housing contains vertical output shaft and gearing. A rotatable handle disposed on the outside of the housing, when rotated, by means of the gearing causes the shaft to rotate at such higher speed. Cutter blades in a hollow container which is sealable by removable lid can be rotated by the shaft to produce the desired blender action. Flywheel means causes the shaft to continue to rotate at essentially constant speed as new material is added for blending. In addition continued rotation of the shaft enables a quick release mechanism to disengage.

5 Claims, 4 Drawing Figures

U.S. Patent   June 22, 1976   3,964,345
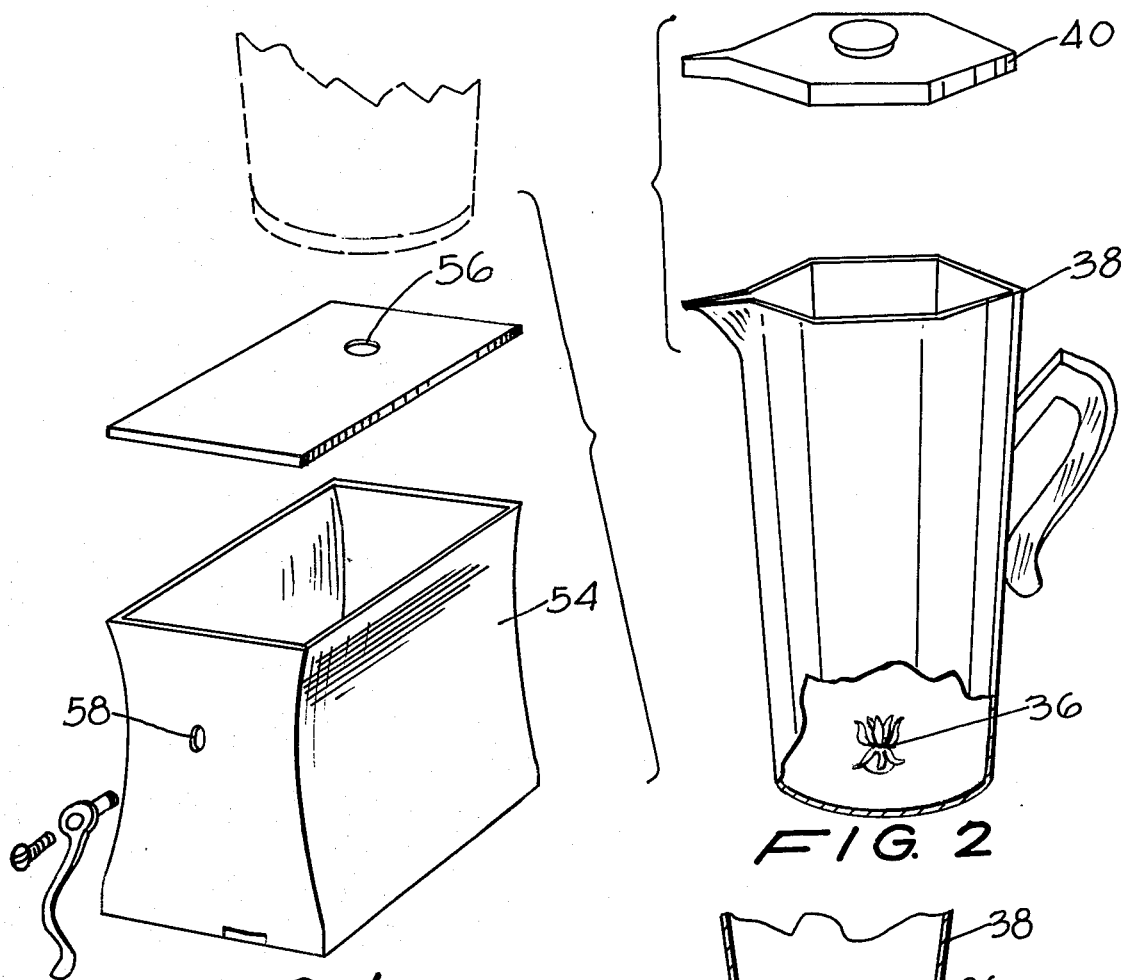
FIG. 1
FIG. 2
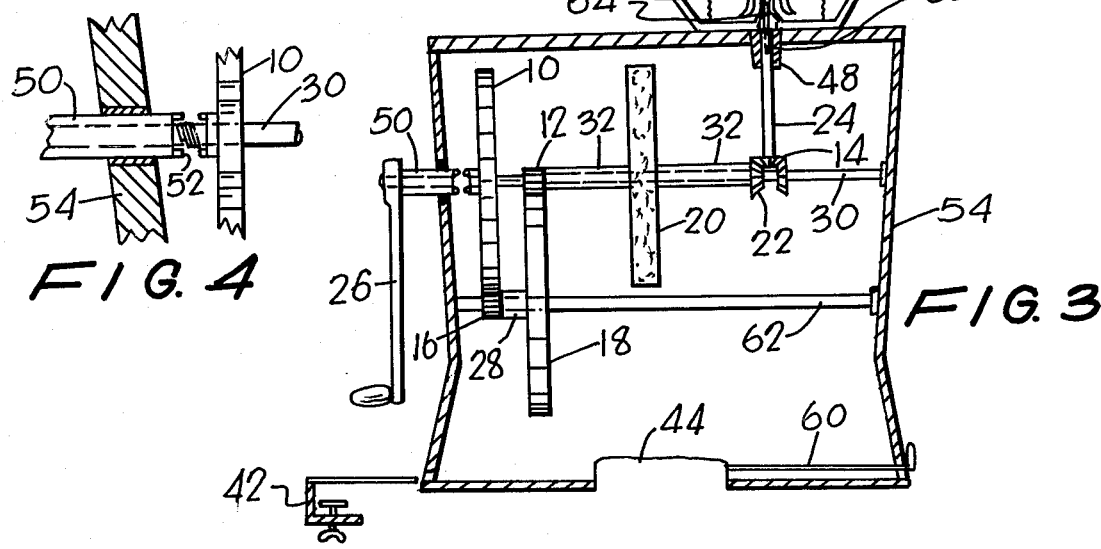
FIG. 4
FIG. 3

MANUALLY OPERABLE BLENDER

SUMMARY OF THE INVENTION

This invention is directed toward a manually operable device wherein a handle rotatable by an operator is connected by suitable gearing to an output shaft in such manner that rotation of the handle causes the shaft to rotate at such higher speed. Cutter blades disposed in a hollow container can be rotated by the output shaft to produce a blender action. Other types of apparatus such as food mixers and grinders can be used in place of the cutter blades if desired. A flywheel can be used to enable the shaft to continue to rotate at essentially constant speed as new material is added for blending. In addition continued rotation of the shaft enables a quick release mechanism to disengage.

This invention can be used conveniently on camping trips, picnics and the like when no electric power is available and of course can also be used in emergency situations of power failure.

BRIEF DESCRIPTION OF THE DRAWINGS

FIG. 1 is an exploded view of the housing.

FIG. 2 is a partially cut away exploded view of container and cap.

FIG. 3 is a cross sectional view of the invention.

FIG. 4 is a detail view of the handle disconnect mechanism.

DETAILED DESCRIPTION OF PREFERRED EMBODIMENTS

Referring now to FIGS. 1–4, hollow housing 54 has top and side holes 56 and 58 with a large suction type cup 54 controlled by manually operable adjusting means 60 to secure the bottom of the housing by suction to a table top or the like, if desired, to prevent undesired movement or vibration during use of the invention. A detachable side mounted clamp 42 can be used to clamp the housing to an edge of the table.

First and second vertically spaced horizontal rods 30 and 62 extend longitudinally within the housing. One end of the upper rod 30 extends into removable sleeve 50 freely rotatable thereabout. Handle 26 is secured to the outside end of the sleeve. The inner end of the sleeve and adjacent center of gear 10 (also freely rotatable about rod 30) carry spring loaded quick disconnect cooperating coupling means 52. A spring is in the connecting grooves of the means applying pressure to outer and inner facings. Pushing handle 26 inwardly interconnectes the means 52 whereby manual rotation of the handle rotates gear 10. (Means 52 can be disconnected by pulling handle 26 outward.) Initially when the operator starts the cranking operation, he must push inward on the handle to engage the grooves. The moment the operator stops turning, he still has a slight hold on the handle. The forward motion of the shaft allows the grooves to disengage and the spring to push the handle out.

Large gear 10 engages small gear 16 rotatably disposed on rod 62. Hollow sleeve 28 rotatable on rod 62 connects small gear 16 to large gear 18 also rotatable about rod 62. Gear 18 engages small gear 12 freely rotatable about rod 30. Hollow sleeve 32 rotatable about rod 30 connects gear 12 to level gear 22 freely rotatable about rod 30. Gear 22 is connected to gear 14 which in turn is connected to the bottom of vertical output shaft 24. The upper end of shaft 24 which has an axial bore 62 is rotatably disposed in bushing 48. A flywheel 20 is secured at its center to sleeve 32.

The gearing and shaft connections and dimensions are chosen to enable gear ratios of 9:1 between gears 10 and 16 and likewise between gear 18 and 12 whereby each rotation of handle 26 will cause shaft 24 to rotate eighty one times. Once the shaft 24 is up to desired speed, flywheel 20 will generate a force which will tend to keep the shaft rotating at constant speed even when additional material is to be added for blending. This force also adds momentum and reduces the normal labor involved in operation.

Hollow pitcher like container 36 with removable top cap or lid 40 has rotatable cutter blades 36 with vertical bottom shaft 64. Rotation of shaft 64 produces rotation of the blades 36. Shaft 64 snap fits into the bore 62 of shaft 24 to enable blades 36 to be rotated when shaft 24 rotates. One method of preventing slippage between shafts 24 and 64 is to construct bore 62 and shaft 64 with square cross sections.

Thus a manually operable blender is provided which can be used easily in locations where electric power is not available. Of course, many other types of devices operating by rotatable shafts can be substituted for the blade carrying container and can be driven by shaft 24 in the same manner as the blender.

The gear ratios can varied from those given above to increase or decrease the speed of rotation of the shaft for a given manual input.

While the invention has been described with detailed reference to the drawings, the protection sought is to be limited only by the terms of the claims which follow.

I claim:

1. A device wherein a manually rotated handle can cause an output shaft to rotate at much higher speed, said device comprising:
   a hollow housing having top and side holes;
   first and second vertically spaced horizontal members disposed in the housing, one end of the first member extending through the side opening;
   a hollow sleeve with said handle secured at one end slidably receiving said one end of the member at its other end, said sleeve being rotatable about the first member;
   a first gear rotatable about the first member;
   coupling means detachably connecting said sleeve to said first gear;
   a second gear rotatable on the second member and coupled to the first gear;
   a third gear rotatable on the second member;
   a first hollow shaft rotatable on the second member and interconnecting the second and third gears;
   a fourth gear freely rotatable on the first member and coupled to the third gear;
   a fifth bevel gear rotatable on the first member;
   a second hollow shaft rotatable on the first member and interconnecting the fourth and fifth gears;
   means supporting said output shaft vertically with its upper end disposed in the top hole; and
   a sixth bevel gear secured to said output shaft and coupled to the fifth gear.

2. The device of claim 1 wherein the first and third gears have like relatively large diameters and the second and fourth gears have like relatively small diameters.

3. The device of claim 2 further including a flywheel secured at its center to the second shaft and rotating therewith.

4. The device of claim 3 further including container means having cutting blades rotatable by a vertical drive shaft, said drive shaft being detachably engagable with the output shaft.

5. The device of claim 3 wherein the upper end of the output shaft has an axial bore and said drive shaft engages said bore.

* * * * *